United States Patent [19]
Ress et al.

[11] Patent Number: 6,076,835
[45] Date of Patent: Jun. 20, 2000

[54] INTERSTAGE VAN SEAL APPARATUS

[75] Inventors: Robert Anthony Ress, Carmel, Ind.; Brian Michael Davis, Cincinnati, Ohio

[73] Assignee: Allison Advanced Development Company, Indianapolis, Ind.

[21] Appl. No.: 08/859,880

[22] Filed: May 21, 1997

[51] Int. Cl.[7] .............................. F16J 15/08; F04D 29/08
[52] U.S. Cl. ...................... 277/637; 277/644; 415/174.2
[58] Field of Search ................... 277/628, 637, 277/644; 415/170.1, 173.1, 173.3, 174.2

[56]  References Cited

U.S. PATENT DOCUMENTS

| | | | |
|---|---|---|---|
| 3,518,020 | 6/1970 | Lake | 415/111 |
| 3,754,766 | 8/1973 | Asplund | 277/236 |
| 4,165,083 | 8/1979 | Dochnahl . | |
| 4,337,016 | 6/1982 | Chaplin | 415/116 |
| 4,529,355 | 7/1985 | Wilkinson | 415/174 |
| 4,573,866 | 3/1986 | Sandy, Jr. et al. | 415/116 |
| 4,747,601 | 5/1988 | Glachet . | |
| 4,932,207 | 6/1990 | Harris et al. | 415/174.2 |
| 5,007,202 | 4/1991 | Guillon . | |
| 5,035,266 | 7/1991 | Benson et al. . | |
| 5,145,316 | 9/1992 | Birch | 415/173.3 |
| 5,188,507 | 2/1993 | Sweeney | 415/173.3 |
| 5,192,185 | 3/1993 | Leonard | 415/174.2 |
| 5,233,824 | 8/1993 | Clevenger | 60/39.75 |
| 5,255,890 | 10/1993 | Morrill . | |
| 5,333,995 | 8/1994 | Jacobs et al. | 415/209.2 |
| 5,562,408 | 10/1996 | Proctor et al. | 415/173.1 |
| 5,678,827 | 10/1997 | Burian et al. . | |
| 5,738,490 | 4/1998 | Pizzi | 415/173.3 |

Primary Examiner—Anthony Knight
Assistant Examiner—John L. Beres
Attorney, Agent, or Firm—Woodard, Emhardt, Naughton, Moriarty & McNett Patent and Trademark Attorneys

[57]  ABSTRACT

A sealing member for sealing between static members, for example between static members of a gas turbine engine. The seal includes a first annular sealing member which includes a first sealing portion and a flange portion. The first sealing member seals a passageway between static members. The flange portion clamps around a flange of a static member, and also seals a portion of circumferential gaps. The first sealing member cooperates with a second sealing member to seal a passageway. Attached to another leg of the flange portion is a ring.

35 Claims, 4 Drawing Sheets

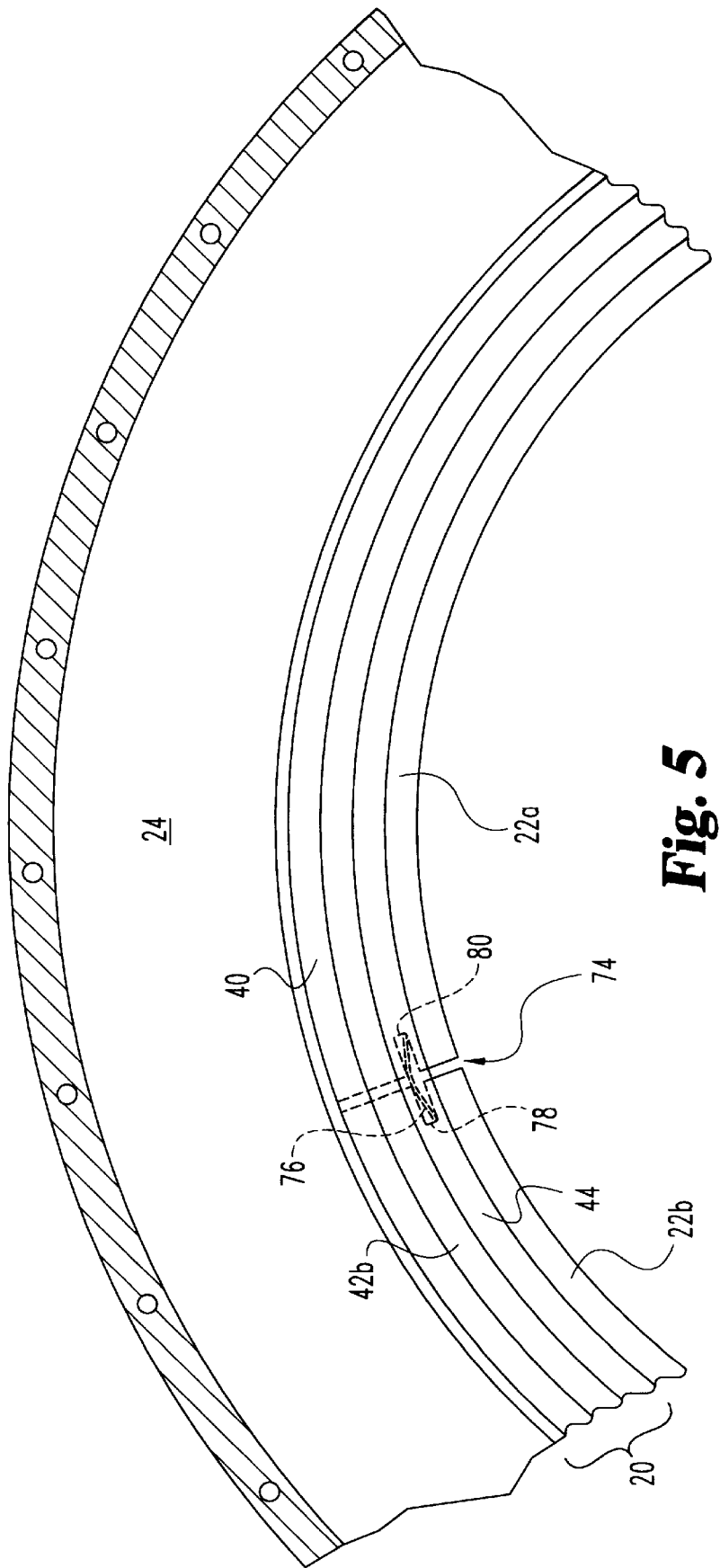

INTERSTAGE VAN SEAL APPARATUS

This invention was made under a United States Government contract and the United States Government has rights herein.

BACKGROUND OF THE INVENTION

The present invention relates generally to structures for sealing between static members within a gas turbine engine. More particularly, in one embodiment the present invention defines a vane interstage seal assembly for minimizing flow recirculating or leaking between vane stages in a gas turbine engine. Although the present invention was developed for use in a gas turbine engine certain applications may be outside of this field.

Typically, the rotating components within a gas turbine engine include one or more rotors that rotate relative to a static structure. Examples of various types of static members found in a gas turbine engine include vanes, stators, compressor cases, combustors, turbine cases, vane cases, fan cases, diffusers, combustor cases, and other components. Much of the engine's static structure is in fluid communication with the working fluid, or flow path of the engine. As gas flows along the engine flow path, the pressure of the gas typically changes, increasing within the compressor and decreasing within the turbine, and creating a pressure differential that can lead to fluid leakage at connecting points between members of the static structure.

Present gas turbine engine designs often use segmented static members. For example, static members such as vanes may be circumferentially segmented into arcuate pieces, such as doublets or triplets, and axially limited to a single stage of expansion or compression. A vane assembly of this type would therefore have circumferential gaps or cavities between it's components and others of the same stage and axial gaps or cavities between the vane assembly and vane assemblies of other stages. If these gaps, cavities, and passageways are not properly sealed, some amount of gas will recirculate off the flow path and around the static member. This recirculation decreases the efficiency of the compressor or turbine, and lowers the overall efficiency of the engine.

Various apparatus have been proposed for providing seals within gas turbine engines. Examples of seals can be found in the following U.S. Pat. No. 3,754,766 issued to Asplund, U.S. Pat. No. 5,333,995 issued to Jacobs et al., U.S. Pat. No. 4,573,866 issued to Sandy, Jr. et al., U.S. Pat. No. 4,337,016 issued to Chaplin, U.S. Pat. No. 4,529,355 issued to Wilkinson, U.S. Pat. No. 5,188,506 issued to Creevy et al., U.S. Pat. No. 5,562,408 issued to Proctor et al., U.S. Pat. No. 3,518,020 issued to Lake, and U.S. Pat. No. 5,233,824 issued to Clevenger.

Even with the variety of earlier designs, there remains a need for a vane interstage seal assembly in gas turbine engines. The present invention satisfies this need in a novel and unobvious way.

SUMMARY OF THE INVENTION

One form of the present invention contemplates an apparatus for sealing between static members of a gas turbine engine. The apparatus includes a first annular sealing member clamped to a second static member and contacting a first static member for reducing the passage of fluid between the members. The apparatus also includes a second sealing member contacting the first sealing member for reducing the passage of fluid along the second static member.

One object of the present invention is to provide an improved vane interstage seal for a gas turbine engine.

Other objects and advantages of the present invention will be apparent from the following description.

BRIEF DESCRIPTION OF THE DRAWINGS

FIG. 5 is a view FIG. 1 taken along line 5—5.

DESCRIPTION OF THE PREFERRED EMBODIMENT

Figure 1:
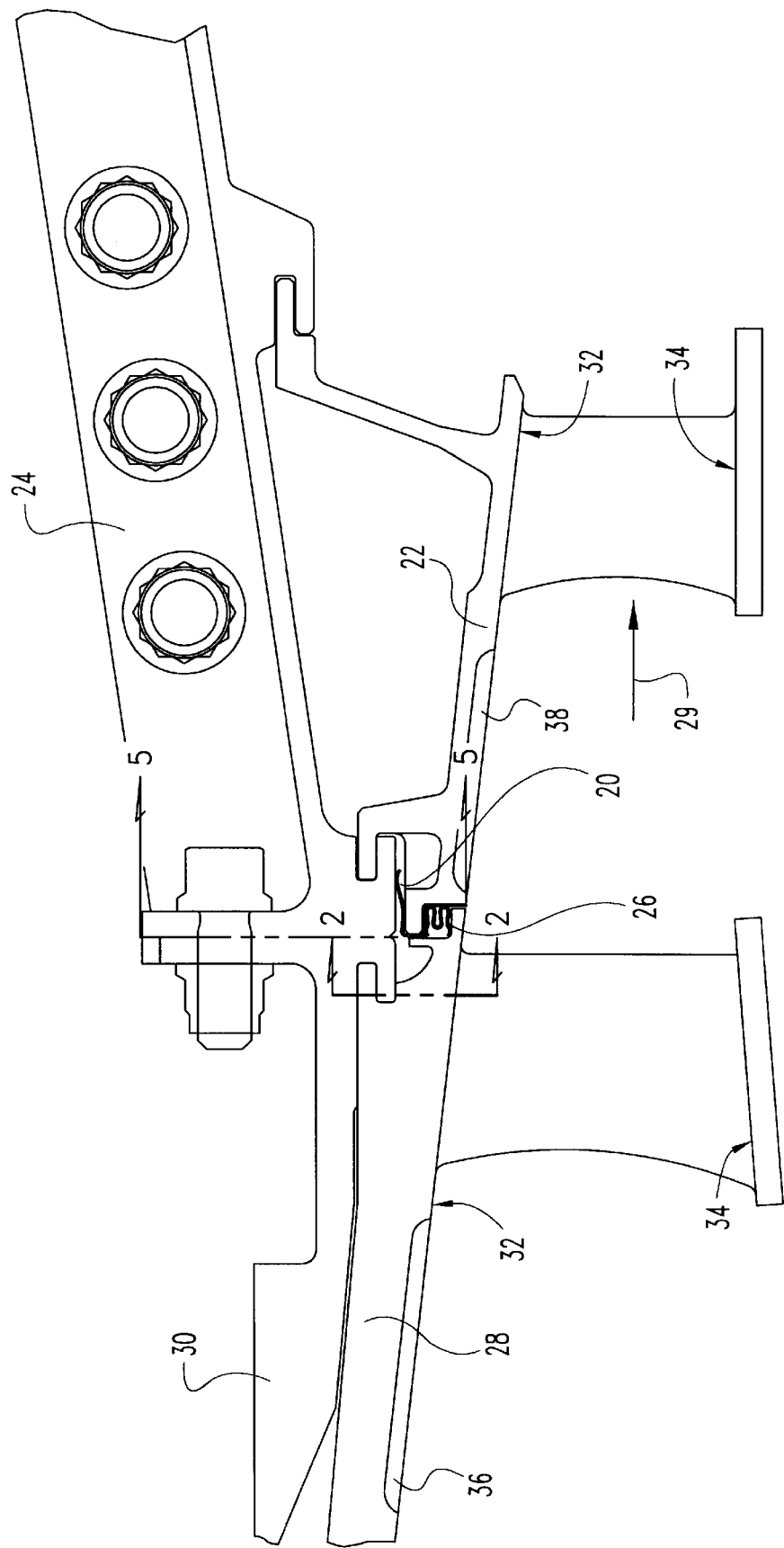
FIG. 1 is a cut-away view of a portion of a gas turbine engine having one embodiment of the present invention positioned therein.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 shows a portion of a gas turbine incorporating the preferred embodiment of the present invention. A second static member, compressor vane assembly 22, is shown installed by flanges received within pockets defined by a first static member, compressor case 24. A third static member, compressor vane 28, is shown installed by a flange to a fourth static member, bypass case 30. Bypass case 30 is fastened to compressor case 24. Although specific examples of static members are depicted and described, the present invention is also useful with other static members found in gas turbine engines, including stators, combustors, turbine cases, vane cases, fan cases, diffusers, combustor cases, and other nonrotating components.

Arrow 29 is parallel to the centerline of the engine axis, and also depicts the general direction of the primary gas or fluid flow path within the compressor. Air flowing in the primary flow path 29 through the compressor is largely contained between outer flow path 32 and inner flow path 34. A portion of the inner flow path between vanes 22 and 28 is not shown. In that portion, the inner flow path is defined by a plurality of compressor blades (not shown). The outer tips of these compressor blades would pass within close proximity to abradable blade tip seals 36 and 38.

FIG. 1 shows first annular sealing member 20 as installed in the static structure. Second sealing member 26 is shown installed and sealing between portions of second static member, vane 22, and a third static member, vane 28.

Figure 2:
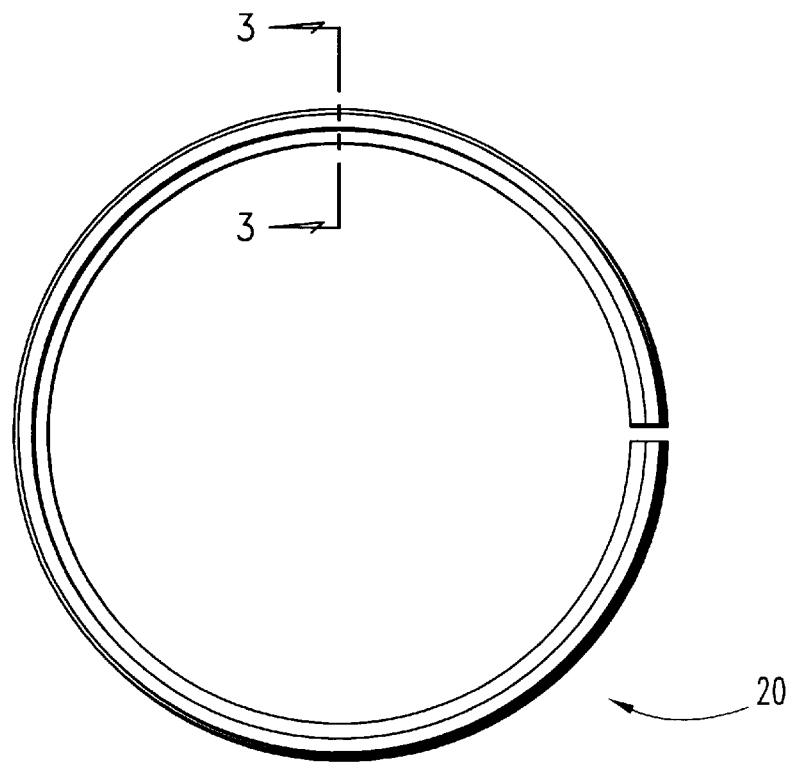
FIG. 2 is a sectional view of the preferred embodiment of the present invention taken along line 2—2 of FIG. 1, with portions of the engine removed for clarity.

FIG. 2 depicts sealing member 20 as seen along line 2—2 of FIG. 1, with sealing member 20 removed from the engine. In the preferred embodiment, sealing member 20 has a generally circular, split construction, and formed from a single piece of sheet metal. Alternatively, sealing member 20 could be fabricated from different pieces that are welded, brazed, or bonded together. It can also be made from nonmetallic materials and various metals, provided the material has characteristics such as strength, coefficient of expansion, hardness and other properties suitable for the environment to which it is exposed. For example, sealing member 20 could be fabricated from a composite or stainless steel when used in a compressor assembly. As another example, sealing member 20 may be constructed from a nickel-based, iron-based, or cobalt-based material when used in a combustion or turbine section of the engine. Sealing member 20 is shown as a single piece, but could be made in two or more segments.

Figure 3:
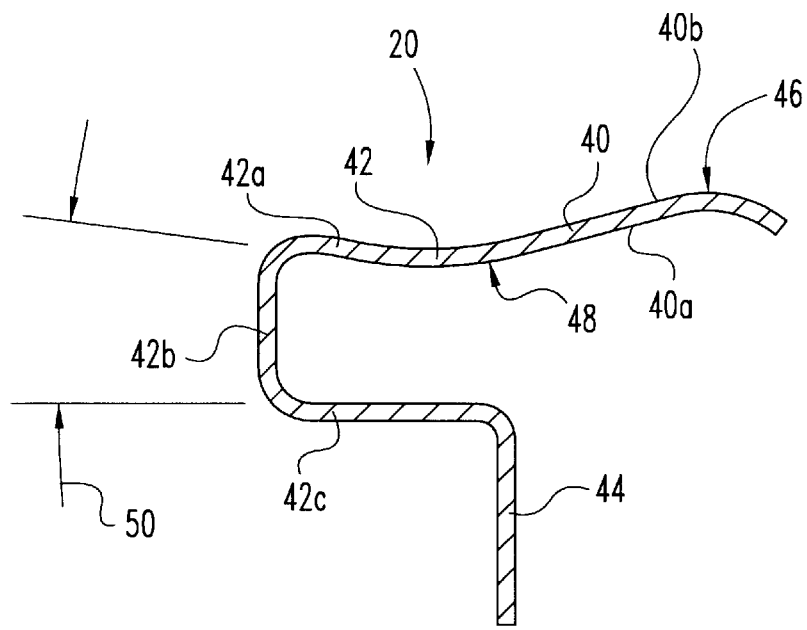
FIG. 3 is a cross-sectional view of FIG. 2 taken along line 3—3.

FIG. 3 is a cross sectional view of sealing member 20 of FIG. 2 taken along line 3—3. Sealing member 20 includes a first sealing portion 40 and a flange portion 42, the latter being generally U-shaped. Portion 40 is generally conically shaped, but is not limited to a conical shape. First sealing portion 40 is cantilevered from first leg 42*a* of flange portion 42. When installed between first static member 24 and second static member 22, seal 40 deforms elastically with sealing contact surface 46 being urged against surface 69 of member 24 (refer to FIG. 4). Surface 46 is formed on a radius of approximately 0.058 inches, although smaller and larger selections of radii work equally well. First sealing portion 40 is unitary or integral with flange portion 42, portions 40 and 42 joining in the vicinity of clamping contact surface 48. Surface 48 is formed on a radius of approximately 0.1 inches, although smaller or larger radii work equally well.

Flange portion 42 is in the approximate shape of the letter "U", incorporating opposing first and second legs 42*a* and 42*c*, respectively, joined by common side 42*b*. Ring 44 is attached to second leg 42*c*. Ring 44 and second leg 42*c* are joined at approximately the same angle as the corresponding surfaces of vane 22. In the preferred embodiment, second leg 42*c* and ring 44 are approximately perpendicular.

Figure 4:
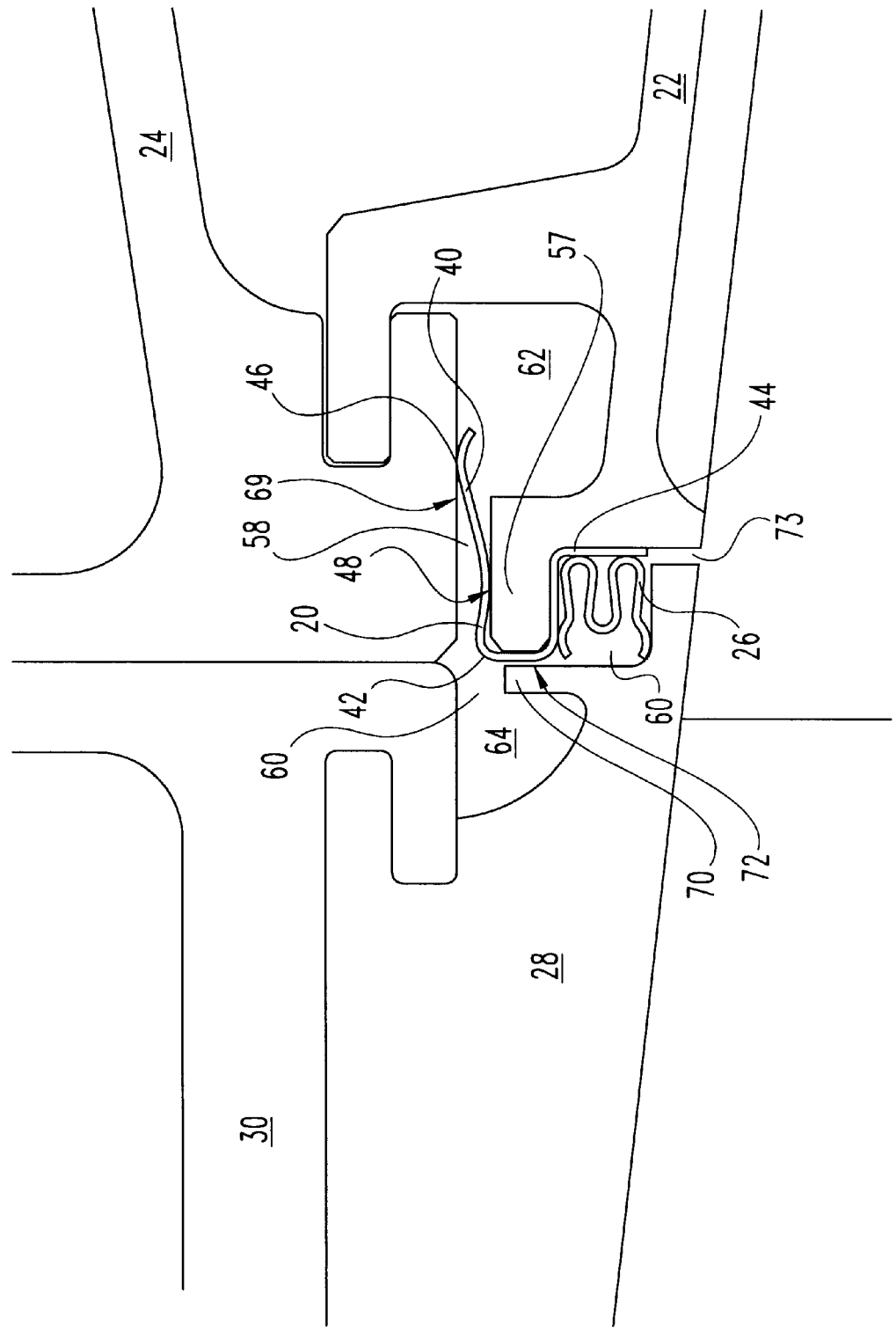
FIG. 4 is an enlarged view of FIG. 1.

Common leg 42*b* is approximately perpendicular to side 42*c*. Side 42*a* is formed at an angle relative to side 42*c*, causing the open side of the U-shape to converge. Angle 50 is an acute angle in the preferred embodiment. As measured between sides 42*c* and 42*a* in the preferred embodiment is about 7.5°. As a result of this convergence, the top of the U-shape is more closed than the bottom, the difference in the width of the "U" providing spring characteristics for flange portion 42 as installed on flange 57. FIG. 4 is a close-up view of FIG. 1 in the vicinity of sealing member 20, showing sealing member 20 installed in an engine. Flange portion 42 clamps around flange 57 of second static member 22. Clamping contact surface 48 is expanded out, and the spring force of flange portion 42 couples sealing member 20 onto flange 57 by friction along the contact surfaces of sides 42*a* and 42*c*.

Installation of the sealing member 20 into the assembly consisting of first static member 24 and second static member 22 results in first sealing portion 40 becoming somewhat flattened as sealing contact surface 46 comes into contact with surface 69 of first static member 24. First sealing portion 40 divides and seals various cavities, gaps, and passageways formed by the assembly of static members 22, 24, 28, and 30. The installation of vane 22 within compressor case 24 creates a first passageway 58. The assembly of vane 28 with bypass case 30 and vane 22 forms a second passageway 60. First sealing portion 40 seals a portion of first passageway 58 from second passageway 60, which passageways would otherwise be in fluid communication.

First passageway 58 contains gas 62 within it at a first pressure. The pressure of gas 62 is related to leakage of gas from the flow path of the engine, especially portions of the flow path downstream of first cavity 58. Second passageway 60 contains gas 64 at a second pressure lower than that of gas 62. Gas 62 is in fluid communication with surface 40*a* of first sealing portion 40, and gas 64 is in fluid communication with surface 40*b*. As a result of gas 62 being at a higher pressure than gas 64, there is a pressure imbalance across first sealing portion 40. This pressure imbalance creates a pressure load on seal 40 that tends to force sealing contact surface 46 against surface 69 of compressor case 24. This pressure load increases the sealing ability of sealing member 20, provided first sealing portion 40 is not so stiff as to resist deformation from this pressure load.

Second seal 26 is shown installed in the engine between third static member 28, leg 42*c*, and ring 44. Seal 26 may be of various configurations, and is shown as an "E" or "W" seal. Seal 26 is circular in nature, extending circumferentially around the engine. Vane 22 and vane 28 define an axial gap 73 between second passageway 60 and the primary flow path. Second seal 26 provides a seal between second passageway 60 and the primary flow path.

Third static member 28 also includes feature 70 which has obstructing surface 72 facing sealing member 20. Obstructing surface 72 limits movement of sealing member 20 if there is movement of sealing member 20 due to the pressure imbalance, vibration, thermal cycling or other reasons. Surface 72 is shown spaced apart from sealing member 20.

FIG. 5 is a view of FIG. 1 taken along line 5—5. FIG. 5 shows a section of the front of compressor case 24 with two second static members 22*a* and 22*b* attached. Vanes 22*a* and 22*b* define circumferential gap 74 between them. Sealing member 20 is shown installed. First sealing portion 40, leg 42*b*, and ring 44 are shown. Sealing member 20 seals a portion of circumferential gap 74. Each vane 22*a* and 22*b* includes opposed, facing pockets 80 and 78, respectively, which have within them axial strip seal 76. Seal 76, located generally above abradable blade tip seal 38, seals high pressure air in cavity 62 that would otherwise leak between adjacent vanes. Seal 76 seals the balance of circumferential gap 74.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus, comprising:
   a gas turbine engine including a first static member and a second static member;
   a first annular sealing member clamped to said second static member and contacting said first static member for reducing the passage of fluid between said first and second static members, said first sealing member having a substantially conically shaped portion; and
   a second sealing member contacting said first sealing member for reducing the passage of fluid along said second static member.

2. The apparatus of claim 1, wherein said gas turbine engine includes a third static member, wherein said second sealing member reduces the passage of fluid between said second static member and said third static member.

3. The apparatus of claim 2, wherein the third static member comprises a vane.

4. The apparatus of claim 1, wherein said second static member comprises a vane having a flange thereon, and wherein said first sealing member clamping the flange.

5. The apparatus of claim 4, wherein said first sealing member having an approximate U shaped portion for clamping said flange.

6. The apparatus of claim 1, wherein said gas turbine engine includes a third static member, said third static member having an obstructing portion for limiting the movement of said first sealing member.

7. The apparatus of claim 1, wherein said second sealing member is an E seal or a W seal.

8. An apparatus, comprising:
   a first annular seal having a first sealing portion and a flange portion;
   a gas turbine engine having a second static member and a first static member being spaced so as to define a passageway therebetween, said second static member includes two adjacent vane segments having a circumferential gap therebetween;
   wherein said first sealing portion extends across said passageway for reducing the passage of fluid through said passageway, said flange portion wrapping around at least a portion of one of said first or second static member so as to hold said first annular seal in place, and said first sealing portion being pressure loaded toward the other of said first or second static members, and further said flange portion seals a portion of the circumferential gap.

9. The apparatus of claim 8, further comprising a second seal contacting said first annular seal.

10. The apparatus of claim 9, wherein said gas turbine engine defines a primary flowpath and includes a third static member, wherein said second static member and said third static member define a second passageway therebetween, and wherein said second seal sealing the second passageway from the primary flow path.

11. The apparatus of claim 8, wherein the second static member is a vane.

12. The apparatus of claim 11 wherein said flange portion includes a ring and a substantially U shaped portion with two opposing legs, the U shaped portion wrapping around the one of said first static member or said vane, said ring being coupled to one of the legs.

13. The apparatus of claim 12 which further comprises a second vane and a second seal, said second seal sealing between said second vane and said flange portion.

14. An apparatus, comprising:
   a gas turbine engine having a first static member and a second static member, said first static member and said second static member defining a passageway therebetween; and
   an annular cantilevered sealing member extending across said passageway for reducing the passage of fluid therethrough, said sealing member having a first portion coupled to the second static member and a second portion contacting the first static member and a ring, said first portion having a first leg and a second leg, said first leg generally opposing said second leg, said first leg and said second leg converging at an acute angle, said ring being coupled to said second leg.

15. The apparatus of claim 14, wherein said first portion and said second portion are integral.

16. The apparatus of claim 14, wherein said acute angle is about seven and one half degrees.

17. The apparatus of claim 14, wherein said ring is oriented approximately perpendicularly to said second leg.

18. The apparatus of claim 17, wherein said ring is an iron-based, nickel-based, or cobalt-based metal.

19. The apparatus of claim 18, wherein said first portion, said second portion, and said ring are formed as a single piece.

20. The apparatus of claim 18, wherein said sealing member is segmented.

21. The apparatus of claim 14, wherein said first static member is a compressor case and said second static member is a compressor vane.

22. The apparatus of claim 21 wherein said compressor vane includes a flange, and the first leg and second leg couple to the flange.

23. The apparatus of claim 22 wherein said second portion is pressure loaded toward said compressor case.

24. An apparatus comprising:
   a gas turbine engine defining a flowpath and including a first static member and a plurality of second static members, said plurality of second static members being in the flowpath, said plurality of second static members being adjacent one another and having circumferential gaps therebetween;
   a first annular sealing member clamped to at least one of said second static members and contacting said first static member for reducing the passage of fluid between said first static member and said plurality of second static members, said first sealing member sealing a portion of the circumferential gaps; and
   a second sealing member contacting said first sealing member for reducing the passage of fluid along said plurality of second static members.

25. The apparatus of claim 24 wherein said first static member is a compressor case, and said first annular sealing member is pressure loaded toward said compressor case by fluid from the flowpath.

26. The apparatus of claim 25 wherein said first annular sealing member includes a U shaped portion for clamping to said first vane.

27. The apparatus of claim 26 wherein said second sealing member is one of an E seal or a W seal.

28. An apparatus, comprising:
   a gas turbine engine including a first static member and a second static member, said second static member having a flange thereon;
   a first annular sealing member clamped to the flange of said second static member and contacting said first static member for reducing the passage of fluid between said first and second static members; and
   a second sealing member contacting said first sealing member for reducing the passage of fluid along said second static member.

29. The apparatus of claim 28, wherein said second static member is a vane.

30. The apparatus of claim 29, wherein said vane is a compressor vane.

31. The apparatus of claim 29, wherein said vane is a turbine vane.

32. The apparatus of claim 28, wherein said first sealing member having an approximate U shaped portion for clamping said flange.

33. The apparatus of claim 28, wherein said first sealing member has a substantially conically shaped portion.

34. An apparatus, comprising:
   a first annular seal having a first sealing portion and a flange portion, said flange portion including a substantially U-shaped portion with two opposing legs and a ring coupled to one of said legs;
   a gas turbine engine having a vane and a first static member being spaced so as to define a passageway therebetween;

wherein said first sealing portion extends across said passageway for reducing the passage of fluid through said passageway, said U-shaped portion wrapping around at least a portion of one of said vane and said first static members to hold said first annular seal in place, and said first sealing portion being pressure loaded toward the other of said vane and said first static member.

35. The apparatus of claim 34 which further comprises a second vane and a second seal, said second seal sealing between said second vane and said flange portion.

* * * * *

UNITED STATES PATENT AND TRADEMARK OFFICE
CERTIFICATE OF CORRECTION

PATENT NO : 6,076,835
DATED : June 20, 2000
INVENTORS : Robert A. Ress, Jr. and Brian M. Davis It is certified that error appears in the above-identified patent and that said Letters Patent are hereby corrected as shown below:

In Col. 1, line 1, replace "VAN" with -- VANE --.

In Col. 5, line 18, replace "scaling" with -- sealing --.

In Col. 5, line 22, replace "member" with - - members - -.

Signed and Sealed this

Twenty-fourth Day of April, 2001

*Attest:*

NICHOLAS P. GODICI

*Attesting Officer*   *Acting Director of the United States Patent and Trademark Office*